United States Patent [19]

Klumperman et al.

[11] Patent Number: 5,439,946
[45] Date of Patent: Aug. 8, 1995

[54] PROCESS FOR PREPARING INTRINSICALLY FOAMED THERMOPLASTIC POLYMER

[75] Inventors: Lubertus Klumperman, Born; Joseph P. H. Boyens; Johannes H. Geesink, both of Schinnen, all of Netherlands

[73] Assignee: DSM N.V., Netherlands

[21] Appl. No.: 108,628

[22] PCT Filed: Feb. 27, 1992

[86] PCT No.: PCT/NL92/00040
§ 371 Date: Aug. 30, 1993
§ 102(e) Date: Nov. 1, 1993

[87] PCT Pub. No.: WO92/15638
PCT Pub. Date: Sep. 17, 1992

[30] Foreign Application Priority Data

Feb. 28, 1991 [NL] Netherlands .......................... 9100370
Feb. 28, 1991 [NL] Netherlands .......................... 9100371

[51] Int. Cl.⁶ .............................................. C08J 9/02
[52] U.S. Cl. ........................................ 521/77; 521/79; 521/146; 521/147; 521/149
[58] Field of Search ............... 521/77, 79, 149, 146, 521/147

[56] References Cited

U.S. PATENT DOCUMENTS

3,547,838 12/1970 Moore et al. ........................ 521/98
4,306,036 12/1981 Corbett ................................ 521/147
4,307,202 12/1981 Corbett ................................ 521/142
4,454,086 6/1984 Corbett et al. ....................... 264/53
4,544,682 10/1985 Corbett et al. ....................... 521/42

*Primary Examiner*—Morton Foelak
*Attorney, Agent, or Firm*—Cushman Darby & Cushman

[57] ABSTRACT

Process and intermediate for preparing an intrinsically foamed thermoplastic polymer comprising a vinyl monomer and maleic acid and/or maleic anhydride, in which process a polymer composition comprising:
a) a core polymer based on
  a.1) 12-50 moles % maleic acid and/or maleic anhydride
  a.2) a vinyl monomer, and
  a.3) optionally a third monomer, where the sum total of a1+a2+a3 is 100 moles % and the weight average molecular weight of the core polymer is 50000-500000, and
b) optionally a nucleating agent, is introduced into equipment suited for making foam, in which process the core polymer, and optionally the nucleating agent, are brought to a temperature which is high enough to release $CO_2$ from the core polymer, and in which process the polymer melt is expanded to form a polymer foam with the desired density. The core polymer is preferably a polymer of styrene and maleic anhydride.

15 Claims, No Drawings

PROCESS FOR PREPARING INTRINSICALLY FOAMED THERMOPLASTIC POLYMER

This application is a 371 of PCT/NL92/0040 filed Feb. 27, 1992.

The invention relates to a process and an intermediate for preparing an intrinsically foamed thermoplastic polymer comprising a vinyl monomer and maleic acid and/or anhydride.

The invention also relates to a foam based on a thermoplastic polymer comprising a vinyl monomer and maleic acid and/or anhydride obtainable according to the process.

Such a process is known from the Japanese patent application JP-A-01170623. In that patent application a process is described for preparing a thermoplastic polymer foam using the intrinsic foaming characteristics of the polymer.

Thermoplastic polymers are generally foamed by means of a blowing agent. Blowing agents can be divided into physical and chemical blowing agents.

Physical blowing agents are inert volatile compounds such as chlorofluoromethanes, aliphatic hydrocarbons containing four to six carbon atoms and inorganic blowing agents such as $CO_2$, $H_2$ and air. They are added to the polymer to be foamed in the melt and expand in consequence of the high temperature. The polymer is foamed to the desired density.

Chemical blowing agents are compounds showing a chemical reaction under the conditions in the melt and in the process release a propellant which expands and causes the polymer melt to foam to the desired density. Examples hereof are organic carbonates delivering $CO_2$ by heating.

The chemical blowing agents can be added to the polymer to be foamed in two ways. The chemical blowing agent is admixed to the polymer to be foamed, in which process the mixing can be effected before the melting or during the melting.

In the polymer to be foamed chemical blowing agents can, however, also be incorporated: during the polymerization of the polymer to be foamed the chemical blowing agent is incorporated as comonomer. Such polymers, with a chemical blowing agent forming an integral part of the polymer, are herein referred to as intrinsically expandable polymers. Chemical blowing agents forming an integral part of a polymer can be divided into additional chemical blowing agents and functional chemical blowing agents.

Additional chemical blowing agents are chemical blowing agents present in the intrinsically expandable polymer as an additional comonomer. Besides delivering a blowing agent, they do not affect the properties of the polymer itself.

Functional chemical blowing agents are chemical blowing agents forming a functional monomer of the intrinsically expandable polymer. Besides delivering a blowing agent, the functional chemical blowing agent is important for the characteristic properties of the polymer itself.

The process described in the Japanese patent application JP-A-01170623 relates to a thermoplastic polymer belonging to the intrinsically expandable polymers. The thermoplastic polymer contains units of a monoester of an ethylenically unsaturated dicarboxylic acid and a vinyl monomer.

During the heating of the thermoplastic polymer according to JP-A-01170623, the monoester decomposes to form the corresponding cyclic anhydride and an alcohol. The alcohol molecules released evaporate at the high temperature and thus function as propellant for the polymer. A limitation of the said preparation process is the temperature at which the foam is formed; this is 120° C.–170° C. The polymer expands just above its Tg.

For the preparation of, for instance, foam obtained from a polymer melt of polymers with a Tg above 120° C. the said process is unsuitable, however. The propellant is formed then in too early a phase. The solubility of the propellant in the polymer melt is thought to be too low, so that the blowing agent might escape. Besides, the polymer may yet be in the form of a solid, so that the gas released may escape via the polymer feed opening.

The object of the invention is to provide a process for preparing a thermoplastic polymer foam comprising a vinyl monomer and maleic acid and/or maleic anhydride, the polymer to be foamed being intrinsically expandable with a Tg of at least 145° C., and which process is excellently suited for preparing foam obtained from a polymer melt via, among other things, extrusion.

This object is achieved according to the invention in that a polymer composition comprising:
a. a core polymer based on
   a.1) 12–50 moles % maleic acid and/or maleic anhydride
   a.2) a vinyl monomer, and
   a.3) optionally a third monomer, where the sum total of a1+a2+a3 is 100 moles % and the molecular weight Mw of the core polymer is 50,000–500,000, and
b. optionally a nucleating agent, is introduced into equipment suited for making foam, in that the core polymer, and optionally the nucleating agent, are brought to a temperature high enough to release $CO_2$ from the core polymer, so that, by means of the $CO_2$ released, the polymer melt is expanded to form a polymer foam.

Preference is given to a temperature of 230°–300° C. The release of the $CO_2$ from the core polymer, which acts as a propellant for the foaming process, can be explained as follows. In the international patent application WP-90/06956 a reaction is described which occurs in a copolymer of a vinyl monomer and an unsaturated dicarboxylic anhydride when triads consisting of two acid anhydrides, bonded by four C-atoms, are present in the copolymer. An example of such a triad is shown in the following formula:

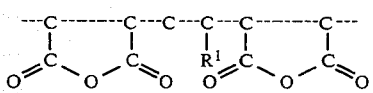

Form. I

In this formula $R^1$ is a hydrogen atom, alkyl, aryl, cycloalkyl, cycloaryl and/or a halogen. Two of the four C atoms mentioned come from the vinyl monomer.

During the heating a reaction takes place between the two acid anhydrides in the triad, causing $CO_2$ to be split off and a spirodilacton according to formula II to be formed:

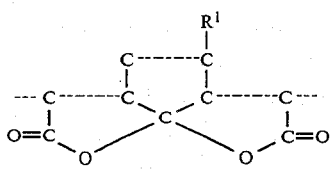

Form. II

After the foaming, the core polymer preferably contains at least 1% (wt) compounds according to formula II. More preferably, after the foaming, the core polymer contains at least 3% (wt), even more preferably at least 6% (wt), compounds according to formula II. As the content of the compounds according to formula II increases, the density of the polymer foam obtained becomes lower.

The core polymer in the polymer composition according to the invention is prepared by mass polymerization or solution polymerization of vinyl monomers and maleic acid and/or maleic anhydride. For such preparation processes reference can be made to Chapters 9 and 10 of Maleic Anhydride, written by B. V. Trivedi and B. M. Culbertson, Plenum Press 1982, 1st edition. The core polymers eligible for the invention have a weight average molecular weight of 50,000 to 500,000 kg/kmole.

The vinyl monomers eligible for the invention are vinyl-aromatic monomers, vinyl-aliphatic monomers, acrylates or mixtures of these. The vinyl-aromatic monomers used may be styrene, alpha-methylstyrene, para-methylstyrene or mixtures of these. The vinyl-aliphatic monomers used may be ethylene, propylene or mixtures of these. The acrylates used may be acrylates, methacrylates or mixtures of these. Preference is given to the use of a vinyl-aromatic monomer, particularly styrene.

The third monomer used according to the invention is such monomer as can be copolymerized with the vinyl monomer and/or the maleic acid or maleic anhydride. Examples of this monomer are ethylenically unsaturated nitriles, imides, such as maleimide, N-alkyl-substituted maleimides and N-aryl-substituted maleimides or mixtures of these.

Core polymers that can be used in the process according to the invention preferably contain 22–40 moles % maleic acid and/or maleic anhydride, the sum total of a1+a2+a3 being 100 moles %. A core polymer in the process according to the invention particularly contains 25–38 moles maleic acid and/or maleic anhydride, the sum total of a1+a2+a3 being 100 moles %.

The nucleating agent used may be the customary agents such as talcum, glass, etc. A nucleating agent may optionally be necessary in order to achieve an evenly distributed cellular structure in the foam. The polymer composition according to the invention may further contain additives such as stabilizers, fillers, glass fibres, etc.

The polymer composition to be used in the process according to the invention is prepared by mixing the core polymer and optionally the nucleating agent and additives in the usual mixing devices such as a Banburry mixer, extruder and the like. The components are mixed for a short time at a temperature of 180°–250° C. The homogeneous mixture is subsequently processed to form granules or a powder.

It is important that the temperature at which the components are mixed should be lower than the temperature at which the blowing agent is released. If the two temperatures are too close together, there is a risk that the core polymer starts foaming already during the preparation of the polymer composition.

With the core polymer to be used in the process according to the invention thermoplastic polymer foams can be obtained. Said powder or granulate is introduced into a processing device known per se, which is suited for the formation of foam. The processing device that is used may, for instance, be an extruder or an injection moulding machine, in the screw channel of which extruder or injection moulding machine the material is heated to the temperature at which the $CO_2$ is released, and at the outlet of which extruder or in the mould of which injection moulding machine the foaming takes place.

It is possible also for the polymer composition to be introduced into a mould in the form of an intermediate such as granulate, powder, a sheet or film or a preform, the mould being partly filled with the intermediate, and for the intermediate to be heated in the mould, so that it expands and fills the mould with the foam. It is possible also for the intermediate to be expanded partly by subjecting it to a short heat treatment, by subsequently introducing the partly expanded intermediate into the mould, and heating it, so that the intermediate continues to expand and fills the mould with the foam. The core polymer present and optionally the nucleating agent are preferably brought to a temperature of 230°–300° C. Below 230° C., the $CO_2$ development does not suffice to make the core polymer expand within a reasonably short period of time. At a temperature above 300° C. undesired degradation may occur in addition to the development of $CO_2$, certainly if the core polymer is kept at such a temperature too long. Preference is given to heating to a temperature of 240°–280°. Special preference is given to a temperature of 250°–270° C. After the $CO_2$ is released, the polymer melt can be treated in the usual way to form a foamed end product with the desired density.

Thus the use of blowing agents such as chlorofluorohydrocarbons (CFC's) becomes superfluous for the foaming of thermoplastic polymers. It is true that with the CFC's very good thermoplastic polymer foams are obtained, but for reasons of environmental hygiene the use of CFC's is deemed to be increasingly less desirable. The use of aliphatic hydrocarbons with four to six hydrocarbons such as n-pentane is also increasingly liable to restrictions. Although polymer foam obtained with n-pentane as propellant has excellent properties, the use of n-pentane and similar substances as propellant is deemed to be less desirable from the point of view of environmental hyiene.

However, it is possible also for the process according to the invention to be carried out while adding a minor amount of a physical or chemical blowing agent. The physical blowing agent, for instance, may have a favourable effect on the rheology of the melt before the expansion, while a minor amount of chemical blowing agent may act as nucleating agent. It is important, however, that the expansion of the thermoplastic core polymer should substantially take place under the influence of the release of the $CO_2$, so that above mentioned advantages at least for an important part are maintained.

Existing processing equipment suitable for making foam is excellently suited for the preparation of a thermoplastic polymer foam by means of the process according to the invention.

The density of the polymer foam is determined by the amount of maleic acid and/or maleic anhydride in the core polymer. If the core polymer contains less than 12 moles % maleic anhydride, an insufficient amount of $CO_2$ splits off to make the core polymer expand to form a polymer foam with the desired density. Further, the temperature and the residence time in the processing equipment play a major role. Too long a residence time or too high a temperature results in chain breakage and degradation of the polymer, whereas too short a residence time or too low a temperature results in an amount of $CO_2$ insufficient for achieving the expansion. Preference is given to such circumstances in which the polymer composition can be expanded to a density of 0.05-0.95 g/cm$^3$, particularly to a density of 0.08-0.85 g/cm$^3$. The upper limit of the density depends on the specific density of the core polymer.

Preferably, in the process according to the invention, a basic catalyst is present, in any case after the core polymer, and optionally the nucleating agent, have been brought to a temperature high enough to release the $CO_2$ from the core polymer, so that by means of the $CO_2$ released the polymer melt expands to form a polymer foam having the desired density.

The effect of the presence of the basic catalyst is a more rapid and more complete release of the $CO_2$.

Preference is given to the use of a basic catalyst that does not react with the maleic acid or maleic anhydride of the core polymer. Suitable catalysts are tertiary amines such as triethylamine (TEA) and 1,4-diazobicyclo[2,2,2]-octane (DABCO). Preferably sterically hindered secondary amines are used as basic catalyst. Special preference is given to derivatives of 2,2,6,6-tetramethylpiperidine. The amount of basic catalyst to be added can easily be determined by experiment. The amount depends on the catalyst used, the equipment in which the core polymer is expanded and the desired foam density. Generally, an amount of basic catalyst of up to 3% (wt) calculated on the amount of core polymer will suffice.

The basic catalyst can be fed to the core polymer in various ways. For instance, a dry blend of the catalyst can be prepared with granulate or powder of the core polymer, optionally with the nucleating agent and other additives, in a mixer suited for that purpose. The resulting dry blend can, for instance, be fed to an extruder or an injection moulding machine. It is possible also for the basic catalyst to be injected in liquid form, for instance because the catalyst is melted or is dissolved in a suitable solvent, into the extruder or the injection moulding machine after the melting of the core polymer therein.

The intermediate preferably contains the basic catalyst. Such an intermediate is prepared by melting the core polymer and mixing it with the basic catalyst, and optionally with the nucleating agent and other additives, in the equipment suited for that purpose, such as a Banbury mixer, a twin-screw extruder, etc. The mixture is then given the form of the intermediate, such as granulate, sheet, film, strips or a preform conforming to the foamed moulded article, and cooled. It is important that the temperature at which the components are mixed should be lower than the temperature at which the blowing agent is released. The advantages of such an intermediate are that the basic catalyst in it is very homogeneously distributed and that the intermediate is highly suited for expanded moulded articles to be prepared from it by filling a mould partly with the intermediate and heating the intermediate in the mould, so that it expands and fills the mould with the foam.

The above will be elucidated by means of the following experiments. It will be clear that the invention is not limited to these experiments.

EXPERIMENTS I AND II

Polymer compositions to be used in the process according to the invention were prepared by compounding an SMA copolymer powder with additives on a vented extruder, type ZSK 30*, the residence time being shorter than 10 seconds. The temperature profile had been set at 60°-100°-110°-200°-220° C. The compounding conditions were identical for all experiments and had been so chosen that the temperature remained below 235° C. Using a single-screw extruder with three-zone screw (D=45 mm, L=30D), the granules obtained were subsequently foamed to form a polymer foam according to the invention. An extruder die having a diameter of 6 mm was used.

*supplied by Werner & Pfleiderer from Germany

The compound compositions, the conditions and results are shown in table 1. This table shows that as the core polymer contains more MA the density of the foam decreases.

TABLE 1

| | Intrinsically foamed polymers | |
|---|---|---|
| Experiments | I | II |
| moles % Maleic Acid Anhydride | 28 | 32 |
| Mw[3] | 110000 | 110000 |
| Nucleating agent[1], % (wt) | 1 | 1 |
| SMA density, g/cm$^3$ | 1.1 | 1.1 |
| Ts °C.[2] | 260 | 260 |
| Foam density, g/cm$^3$ | 0.85 | 0.45 |

[1] nucleating agent = Microtalk IT extra
[2] Ts = temperature at which the propellant is released
[3] Mw = weight average molecular weight

EXPERIMENTS III-VII

Granules were prepared according to experiments I and II, but a basic catalyst di(2,2,6,6-tetramethyl-4-piperidyl)seborcate was added. Foam was prepared also according to experiment I and II. The results are given in table 2.

This table shows that as the core polymer contains more MA the density of the foam increases and that by the addition of a basic catalyst the density of the foam decreases.

TABLE 2

| Experiment | III | IV | V | VI | VII |
|---|---|---|---|---|---|
| mole % Maleic Acid Anhydride | 12 | 18 | 22 | 28 | 28 |
| Mw (× 100) | 110 | 110 | 110 | 110 | 80 |
| SMA density, g/cm$^3$ | 1.1 | 1.1 | 1.1 | 1.1 | 1.1 |
| Nucleating agent[1], % (wt) | 1 | 1 | 1 | 1 | 1 |
| Catalyst[2], % (wt) | 0.4 | 0.4 | 0.4 | 0.4 | 0.4 |
| Ts °C.[3] | 260 | 260 | 260 | 260 | 260 |
| Foam density, g/cm$^3$ | 0.96 | 0.53 | 0.20 | 0.12 | 0.18 |

[1] Nucleating agent = Microtalk IT extra
[2] Catalyst = di(2,2,6,6-tetramethyl-4-piperidyl)sebacate
[3] Ts = temperature at which the propellant is released
[4] Mw = weight average molecular weight

We claim:
1. A process for preparing an intrinsically foamed thermoplastic polymer which comprises:
   introducing an intrinsically foamable polymer composition into equipment suitable for foaming, wherein said polymer composition comprises (a) a copolymer comprising (a1) 15-50 moles of maleic acid and/or maleic anhydride, and (a2) a vinyl monomer, wherein the weight average molecular weight of said copolymer is 50,000 to 500,000, and bringing the polymer composition to a temperature high enough to release carbon dioxide from said copolymer, whereby an intrinsically foamed thermoplastic polymer is obtained.

2. The process according to claim 1, wherein said copolymer further comprises (a3) an other monomer, wherein the sum of (a1) plus (a2) plus (a3) is 100 mole %.

3. A process according to claim 1 or 2, wherein said polymer composition further comprises a nucleating agent.

4. The process according to claim 1, wherein the polymer composition is brought a temperature in the range of 230° C. to 300° C.

5. The process according to claim 2, wherein the copolymer contains 22 to 40 moles % of maleic acid and/or maleic anhydride, and wherein the sum total of (a1) plus (a2) plus (a3) is 100 moles %.

6. The process according to claim 2, wherein the copolymer contains 25–38 moles % of maleic acid and/or maleic acid anhydride, and wherein the sum total of (a1) plus (a2) plus (a3) is 100 moles %.

7. The process according to claims 1, 2, 4, 5 or 6 wherein the vinyl monomer is a vinyl-aromatic monomer.

8. The process according to claims 1, 2, 4, 5 or 6, wherein the vinyl monomer is styrene.

9. The process according to claims 1, 2, 4, 5, or 6, wherein the temperature at which $CO_2$ is released is between 240° C. and 280° C.

10. The process according to claims 1, 2, 4, 5 or 6, wherein the temperature at which $CO_2$ is released is between 250° C. and 270° C.

11. The process according to claims 1, 2, 4, 5 or 6, wherein the polymer foam obtained has a density of 0.5–0.95 grams/cm$_3$.

12. The process according to claims 1, 2, 4, 5 or 6, wherein the polymer foam obtained has a density of 0.08–0.85 grams/cm$_3$.

13. The process according to claims 1, 2, 4, 5 or 6, wherein in said process, a basic catalyst is present at least after the intrinsically foamable polymer composition has been brought to a temperature high enough to release the $CO_2$ from said copolymer.

14. The process according to claims 1, 2, 4, 5 or 6, wherein in said process a basic catalyst is present at least after the intrinsically foamable polymer composition has been brought to a temperature high enough to release $CO_2$ from said copolymer, wherein said basic catalyst is a sterically hindered secondary amine.

15. A process for preparing an intrinsically foamed thermoplastic polymer which comprises introducing an intrinsically foamable polymer composition which consists essentially of (a) a copolymer having (a1) 12–50 moles % of at least one member selected from the group consisting of maleic acid and maleic anhydride, (b) a vinyl monomer, and (c) a monomer which can be copolymized with the vinyl monomer and/or the maleic acid or maleic anhydride, wherein said monomer is at least one member selected from the group consisting of ethnically unsaturated nitriles and imides, wherein the sum total of (a1) plus (b) plus (c) is 100 mole %, and the weight average molecular weight of said copolymer is 50,000 to 500,000, and (d) a nucleating agent; and raising the temperature of said polymer composition to obtain a melt and to release carbon dioxide from said copolymer in an amount effective to foam intrinsically said melt whereby the intrinsically foamed thermoplastic polymer is obtained.

* * * * *